July 22, 1969     S. BROCKHAUS     3,456,491
DEVICE FOR MEASURING THE DENSITY OF A FLUID
Filed Oct. 23, 1967     5 Sheets-Sheet 3
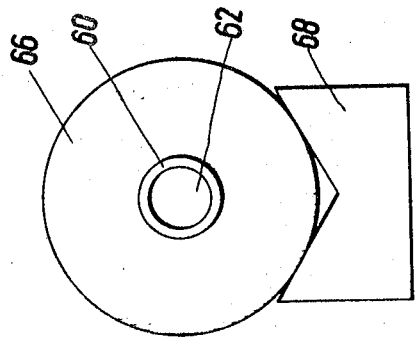
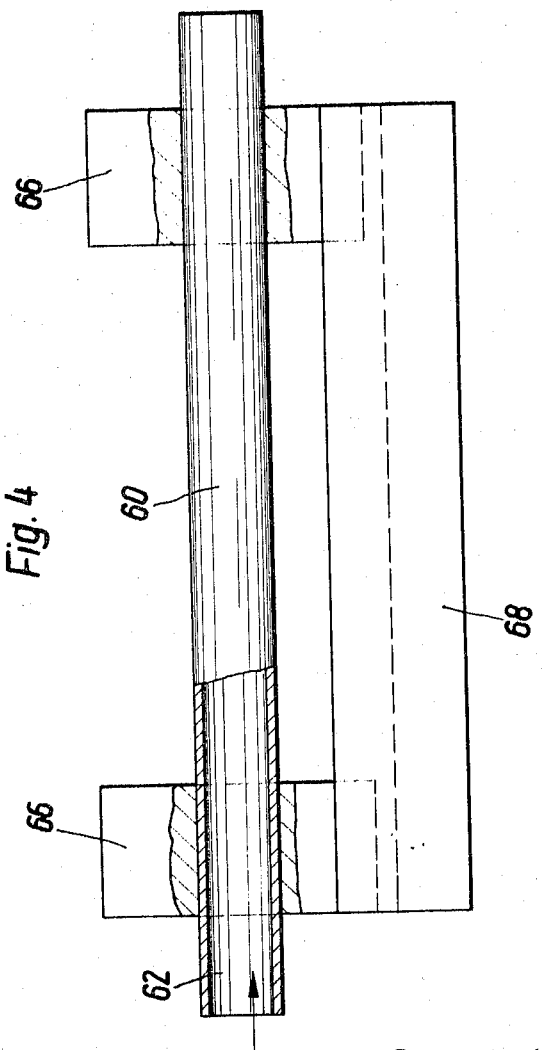
Inventor:
Siegfried Brockhaus
By Michael S. Strecker
Attorney

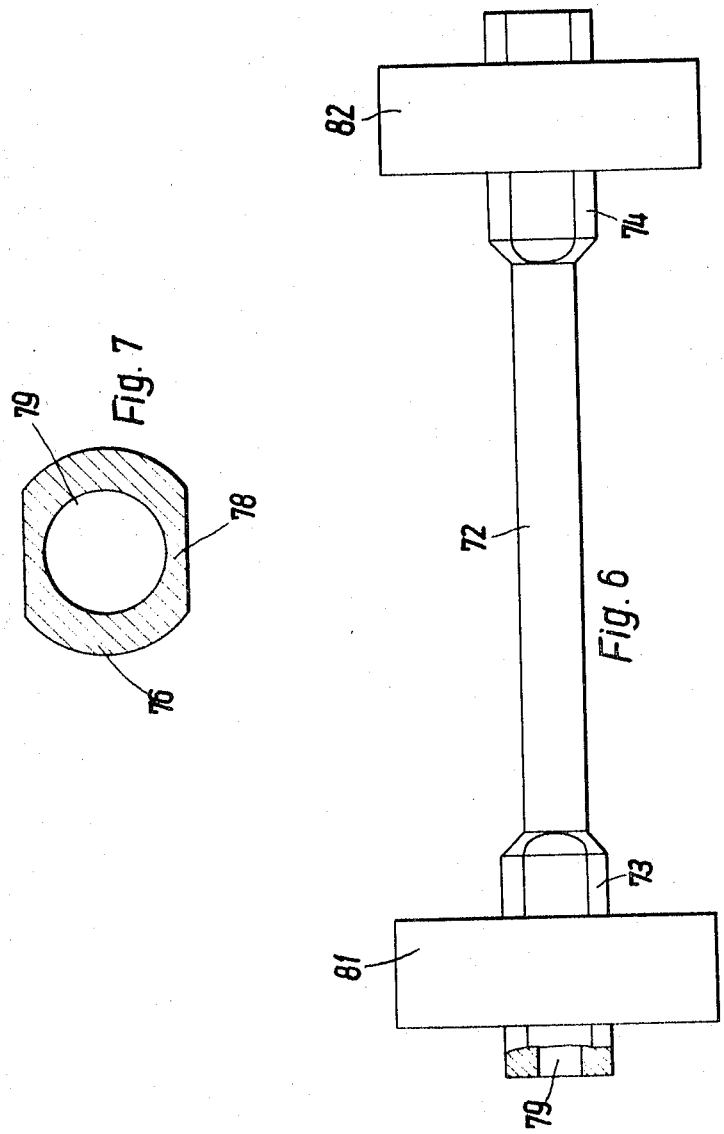

July 22, 1969   S. BROCKHAUS   3,456,491
DEVICE FOR MEASURING THE DENSITY OF A FLUID
Filed Oct. 23, 1967   5 Sheets-Sheet 5
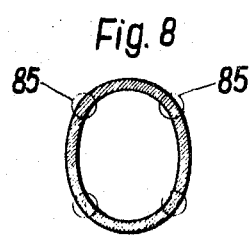
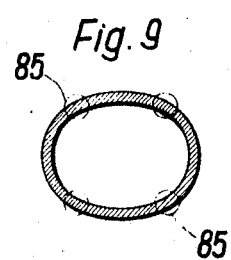
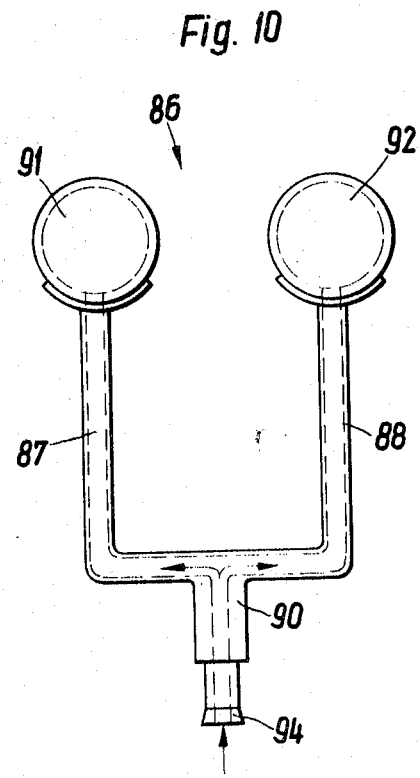
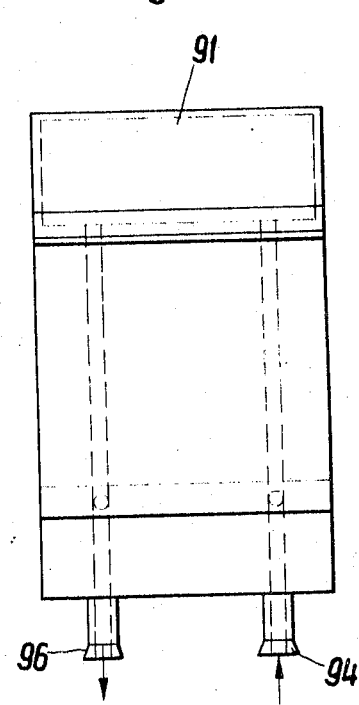
Inventor:

United States Patent Office 3,456,491
Patented July 22, 1969

3,456,491
DEVICE FOR MEASURING THE DENSITY OF A FLUID
Siegfried Brockhaus, 21 Schaphausstrasse, 43 Essen-Heidhausen, Germany
Filed Oct. 23, 1967, Ser. No. 677,514
Claims priority, application Germany, Oct. 22, 1966, B 89,535
Int. Cl. G01n 31/00
U.S. Cl. 73—32                                4 Claims

ABSTRACT OF THE DISCLOSURE

A device for measuring the mass or density of a liquid having a pipe with an inlet and outlet for passing said fluid therethrough. This pipe is adapted to oscillate and an arrangement is provided for exciting said pipe at its resonant frequency as determined by the respective type of fluid contained in the pipe.

Background of the invention

This invention is generally concerned with the problem of determining the mass or density of a fluid, in particular of liquids and in a substantially continuous manner. Especially, this invention relates to a measuring device operated on the basis of determining the resonant frequency of a certain system capable of oscillating and including the fluid whose density is to be determined.

Devices for measuring the density of a liquid according to the prior art generally are based on the principle of collecting a certain amount of the fluid or liquid to be studied in a container of known volume and then weighing the total weight of the container and the fluid contained therein. However, such a principle is comparatively time consuming and cumbersome. Furthermore, a continuous measurement by determining the weight of the fluid under investigation requires means making such a procedure very expensive. In addition, in connection with such a known principle, there are comparatively many factors detrimental to and causing errors in the precise result of the measurement. For example, considerable difficulties are experienced in connection with supplying the fluid to and removing it from the measuring device without affecting the assumed measuring conditions.

It is therefore an object of this invention to provide a device for measuring the density of a fluid which device is substantially free of any detrimental influences causing errors in the accuracy of the measurement.

It is a further object of this invention to provide a device for measuring the density of a fluid which device is easy to handle, inexpensive in manufacture and capable of delivering reliable results.

It is still a further important object of this invention to provide a device for measuring the density of a fluid which device is capable of carrying out such a measurement in a substantially continuous manner.

It is another object of this invention to provide a density measuring device of simple structure which is independent of external influences as they might be caused in particular by changes in the ambient temperature.

In order to accomplish these and other objects, according to this invention the fluid to be studied is conducted through tubular means having a passageway with an inlet and an outlet for the fluid. This tubular means is clamped in such a manner, that it may be excited by a suitable arrangement and may oscillate at its resonant frequency. Dependent on the density of the fluid contained in this tubular means, the resonant frequency will vary and thus furnish a clear indication about the density of the fluid under investigation. The resonant frequency may be ascertained readily by measuring the frequency of the exciting arrangement. The inlet and outlet ports for the fluid are located outside the area in which the oscillation occurs, so that no additional members as hoses or the like would participate in the oscillation.

Further features and advantages of the present invention will become apparent in connection with the following description of preferred embodiments of the invention as illustrated in the accompanying drawings, in which:

FIG. 4 is a diagrammatic representation in elevation of another embodiment of this invention, partly in section;

FIG. 5 is an end view of the structure of FIG. 4;

FIG. 6 is an elevational view, partly in section, of another, slightly modified embodiment of this invention;

FIG. 7 is a cross-section through FIG. 6 taken along line 7—7 and on a somewhat enlarged scale;

FIG. 8 and FIG. 9 illustrate the deformation of a pipe oscillating in accordance with another embodiment of this invention with respect to its circumferential shape instead of oscillating in its entirety with respect to its longitudinal axis;

FIG. 10 is an end view in elevation of a tune fork-like structure contituting a further embodiment of this invention; and FIG. 11 is a side elevational view of FIG. 10.

Figure 1:
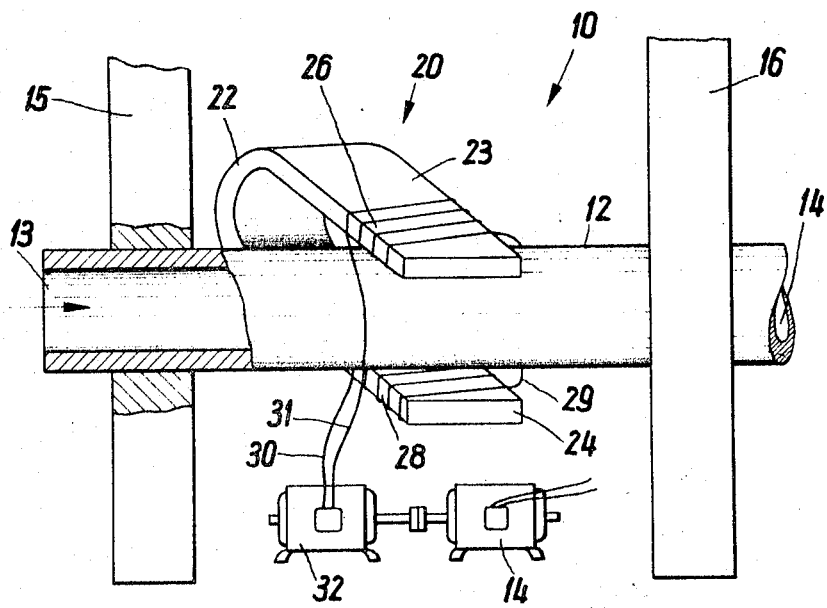
FIG. 1 is a diagrammatical elevational view, partly in section, of the measuring device of this invention with an associated exciting electromagnetic system partly shown in perspective view.

Referring now to the drawings, the reference character 10 generally designates a measuring device according to this invention. A pipe 12 having an inlet 13 and an outlet 14 extends through lateral support walls 15 and 16. Walls 15 and 16 constitute a substantially rigid immovable system to which pipe 12 is likewise connected in a substantially rigid manner. Pipe 12, which preferably may be of circular cross-section or cylindrical configuration is made of a resilient material enabling the pipe to oscillate radially to a certain extent when excited by a suitable means. The distance between walls 15 and 16 is chosen such that the radial oscillation of pipe 12 can take place as desired.

Pipe 12 is embraced by an electromagnet generally designated 20. This electromagnet 20 comprises a U-core having two pole pieces 23 and 24 provided with excitation coils 26, 28 in the vicinity of its ends. Coils 26 and 28 are connected in series with each other by means of a lead 29, whereas their ends may be connected through leads 30, 31 to a generator of alternating electric energy 32 driven by an electric motor 34 mechanically coupled thereto. By varying the rotations per time unit of said motor 34, the frequency of the alternating voltage supplied by said generator 32 to said coils 26, 28 may be varied in a suitable manner.

Accordingly, the frequency of the alternating magnetic field acting upon pipe 12, which in this case is made of a resilient magnetic material such as steel or the like, can be adjusted to such an amount that the pipe 12 clamped between walls 15 and 16 will be excited at its resonant frequency, which condition easily may be ascertained.

This resonant frequency of the excited pipe will depend upon the physical mass of the pipe 12. The mass of pipe 12, in turn, will depend on the density of the fluid contained in the hollow space thereof. Thus, there will be different resonant frequencies for different kinds of fluid filling the pipe 12. The system oscillating at this resonant frequency is comprised basically of a spring component as constituted by the clamped elastic pipe 12 and of a mass component as composed of the mass of pipe 12, on the one hand, and the mass of the fluid to be studied, on the other hand. The fluid contained in pipe 12 will not have any spring effect. As a consequence, when the resonant frequency of the swinging system has been set, the mass of the respective fluid and the density corresponding thereto may be determined readily in a manner known per se.

As apparent, the new measuring device 10 of this invention does not include any elements not actually being parts of the oscillating system, i.e. that would not be either a portion of the actual mass component or the actual spring component, and which otherwise might affect the accuracy of the measuring device 10.

It will be understood, that any other means capable of exciting electromagnet 20 by means of a voltage of variable frequency or, in general, different means for oscillating pipe 12 in a manner indicated above, may be used and are fully within the scope of this invention, the electromagnet 20 merely being an example for carrying out this invention.

Figure 2:
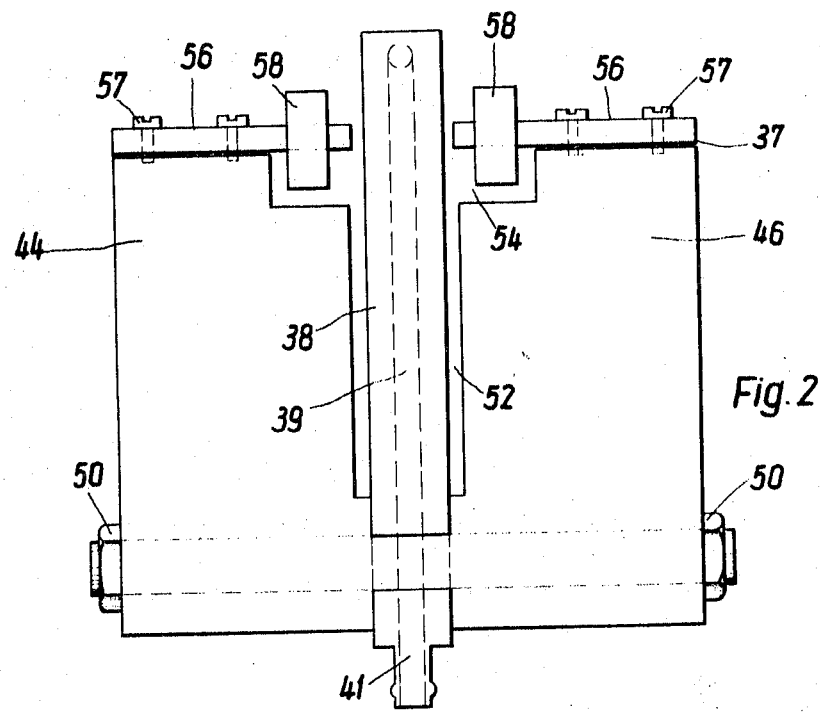
FIG. 2 is a further embodiment of this invention wherein the tubular means for conducting the fluid under investigation is constituted by a bar-like member clamped merely at its one end.
Figure 3:
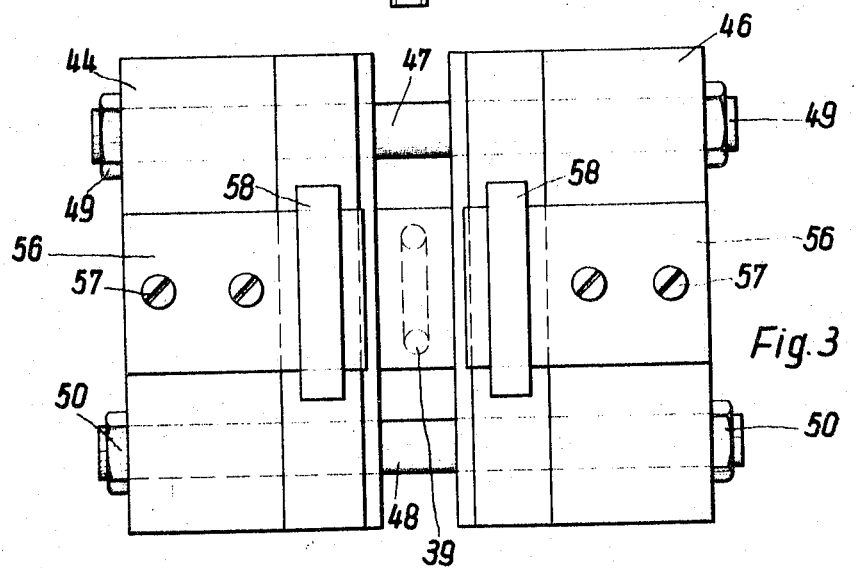
FIG. 3 is an elevational top view of the structure of FIG. 2.

FIGS. 2 and 3 show a further embodiment of this invention. The oscillating system for ascertaining the density of a fluid here is designated generally by reference numeral 37. In this embodiment, the tube means is constituted by a bar-like member 38 having a U-shaped channel 39 communicating with an inlet 41 and a corresponding outlet (not shown). This bar-like member 38, which likewise is made of a resilient material so that it is capable of oscillating in a direction normal to its longitudinal axis, is clamped—in contrast to the pipe 12 of FIG. 1—only at one point between two blocks 44 and 46 of comparatively great weight relative to the weight of member 38. Both blocks 44 and 46 are arranged at opposite sides of member 38 and are secured to each other by bolts 47, 48 fastened by nuts 49 and 50, respectively, thereby clamping the bar-like member 38 in the desired manner.

The fluid may be fed to channel 39 and may be discharged therefrom through suitable flexible hoses (not shown) fitted over the respective inlet and outlet studs provided at the ends of channel 39.

A clearance 52 is provided between blocks 44, 46 and member 38, so that member 38 may freely oscillate. At the upper ends of blocks 44, 46, there are recesses 54, and tongues 56 are mounted to the upper ends of blocks 44, 46 by bolts 57, which tongues protrude beyond said recesses 54 and terminate at a certain distance from member 38, so that member 38 may be subjected to oscillations in a direction normal to its longitudinal axis without, however, contacting tongues 56 and thereby affecting its free movement. The recesses 54 are so dimensioned that they are capable of receiving excitation coils 58 associated with the inner ends of tongues 56.

Coils 58 may be joined to a source of alternating electric energy of variable frequency, as explained similarly in conjunction with FIG. 1.

In case, for example, the system of FIG. 1 is subjected to changes of the ambient temperature, such changes may cause considerable tensional or compressive forces acting upon the rigidly clamped pipe 12, which forces might affect the resonant frequency of the oscillating system, thereby affecting the accuracy of the measurement. It may therefore be desirable to protect the oscillating system against such additional and uncontrollable forces. Accordingly, as shown in FIG. 4, a pipe 60 having an inlet 62 and an outlet 64, may be inserted in the vicinity of its ends into annular members 66 of comparatively great weight. Member 66 and pipe 60 are rigidly connected with each other, for instance by shrinking members 66 onto pipe 60.

Both annular members 66 rest upon a prismatic support rail having the cross-section as shown in FIG. 5. At least one of these annular members 66 may slide upon the contacting surface of rail 68 in axial direction of pipe 60, i.e. in the direction of the double headed arrow 70. The same may apply to the second annular member 66. Due to such an arrangement, pipe 60 when associated with an exciting system as explained in conjunction with the embodiments of FIG. 1 and FIGS. 2, 3 may oscillate as if it were rigidly clamped, but due to the slidable connection between member 66 and rail 68 the tensional or compressive forces may expand or shorten pipe 60 in axial direction, so that these temperature caused forces will not generate tensions in pipe 60 which would affect the accuracy of the oscillating system, but will merely move one of or both member 66 and otherwise remain without any noticeable effect on the measuring device.

As in the embodiments described above, the fluid to be investigated is supplied to pipe 60 preferably through flexible hoses or the like not exerting any forces upon pipe 60 that might affect the density measurement, especially the ports communicating therewith are located outside the area of oscillation.

In practice, it may well occur that the pipe used as a tubular means in connection with the oscillating system is not absolutely circular and, moreover, does not possess a really uniform thickness along its entire circumference. The moment of inertia determining the resonant frequency would then not be exactly the same in all radial directions. Instead, there would be different reference axes and in particular, one axis corresponding to a moment of minimum inertia and one axis corresponding to a moment of maximum inertia. The resonant frequency for each of these maximum and minimum moments would differ from each other and correspond to oscillations of different amplitudes. However, it may be uncertain in what planes the respective axes would extend and, moreover, it may be difficult to analyze the difference between the different resonant frequencies.

According to a further embodiment of this invention, such uncertainties may be avoided by providing an oscillating pipe of a cross-section clearly distinguished from that of a circle, so that two axes are obtained with respect to which the moments of inertia differ in a clearly noticeable manner. The axes of minimum and maximum moment of inertia will then be clearly defined so that the exciting system may be associated with the oscillating system in such a manner, that oscillating movements take place merely in the plane of either said minimum or said maximum inertia moment under precisely known conditions.

In order to accomplish this, the pipe may be of elliptical or rectangular cross-section, which last mentioned cross-sections have axes whose respective moments of inertia are clearly different from each other. However, in case the pressure of the fluid conducted through the pipe is sufficient to deform the cross-section thereof the resonant frequency would be influenced by the pressure prevailing within said pipe.

FIGS. 6 and 7 illustrate a suitable embodiment of this invention ensuring an oscillation under defined conditions and without any significant dependency on the fluid pressure. The pipe which here is designated with reference numeral 72 may, at its ends, have sections whose cross-sections are of O-like shape as apparent from FIG. 7. This O-like cross-section has two perpendicular axes 76, 78 corresponding to a minimum and a maximum moment of inertia. The fluid channel 79, however, is of circular cross-section, so that no alterations of any significance of the moments of inertia can be caused by a pressurized liquid running through channel 79.

In order to ensure the oscillation of pipe 72 as desired in one defined plane by providing two axes of different moments of inertia, it is sufficient to provide such a non-circular cross-section merely at the ends of the pipe 72, which—similarly as the ends of pipe 60 of FIG. 4—are rigidly connected to two clamping members 81, 82 of great weight, which likewise may be guided slidably upon a suitable surface as this holds true for the annular members 66 of FIG. 4.

According to a further embodiment of this invention, the fluid conducting pipe may not be oscillated radially, but the material of the pipe and the association with the exciting arrangement may be such that the cross-section of the pipe is altered in an oscillating manner. As shown in FIG. 8, at a certain time, the normally circular pipe may have an elliptical cross-section with its longer axis extending in vertical direction; when half an oscillation period has elapsed, the pipe will have assumed the configuration as shown in FIG. 9 with its longer axis extending in horizontal direction. Still half an oscillation period later, the configuration of FIG. 9 will have changed to that of FIG. 8 again, and so forth. The oscillations hereby take place about nodal points 85 and the amplitudes of the oscillation are a maximum in the middle between each adjacent pair of these points 85, which extend along lines parallel with the longitudinal axis of the pipe.

A further embodiment of this invention is illustrated in FIGS. 10–11. According to this embodiment, the tubular means or the oscillating system, respectively, is not constituted by a substantially straight body but by a tune fork-like structure as generally designated with reference character 86. This structure has two lateral and preferably parallel walls 87, 88 bifurcating from a stem portion 90. At their upper ends remote from said stem portion 90 these lateral walls terminate into containers 91, 92.

The stem portion 90 is provided with the necessary inlet and outlet studs 94 and 96, respectively, for feeding the fluid to be studied through containers 91, 92. Inlet stud 94 communicates with containers 91 and 92 through upstream passageways 97a and 97b, respectively. In a corresponding manner, outlet stud 96 communicates with containers 91 and 92 through downstream passageways 98a, 98b. Passageways 97a, b and 98a, b are formed as channels of comparatively small diameter extending through stem portion 90, and bifurcating from there into the lateral walls 87, 88. The fluid is supplied to inlet stud 94 and discharged from outlet stud 96 through suitable flexible hoses not contributing to the physical mass of the tune fork-like structure 86.

The fluid may thus enter through inlet stud 94, reach containers 91 and 92 through upstream passageways 97a, b, fill containers 91, 92, and leave through the passageways 98a, b and outlet stud 96. Depending on the specific weight or density of the fluid present in containers 91, 92 and passageways 97a, b as well as 98a, b, the tune fork-like structure will have different resonant frequencies, which again may be determined readily by exciting the system by means of a suitable arrangement such as the electromagnet 20 shown in FIG. 1.

As in the embodiments described above, the fluid may be conducted through the measuring device in a continuous manner, so that continuous measurements may be made without interruptions and without the necessity of removing or disconnecting the measuring device from the fluid conducting circuit. Likewise, the entire system, with all its physical conditions being known, fully takes part in the resonant oscillation, so that the density of the fluid can be ascertained in a very precise manner, since there are no external elements of unknown influence that would influence the accuracy of measurement.

What is desired to be secured by Letters Patent is:

1. A device for ascertaining the density of a fluid and comprising support means; tube means in form of a substantialy straight pipe of resilient material clamped at two points having a distance from each other so as to enable said pipe to oscillate in a direction normal to its longitudinal axis when filled with fluid, said pipe having an inlet and an outlet located outside of said distance extending between said clamping points, said pipe being clamped at least on one of said two points by means of a member of considerable weight as compared to that of said pipe, and said member being slidably guided in axial direction of said pipe; and means for exciting said pipe so as to oscillate at its respective resonance frequency depending upon the density of the respective fluid contained therein.

2. A device as set forth in claim 1, wherein said tube means is made of a magnetic material such as steel and wherein said oscillating means is an electromagnetic arrangement having at least one pole piece adapted to act upon said tube means and provided with a coil of excitation, said coil of excitation being connected to a source of alternating electric energy of variable frequency.

3. A device as claimed in claim 2, wherein said tube means is made of such a material and is of such a cross-section and wherein said electromagnetic arrangement is associated with said tube means in such a manner that the cross-section of said tube means is deformed periodically at the resonant frequency of the tube means filled with said fluid along a predetermined section of said tube means.

4. A device as set forth in claim 1, wherein said tube means has portions of non-circular cross-section symmetrical with respect to two axes (76, 78) perpendicular to each other.

References Cited

UNITED STATES PATENTS

| | | | |
|---|---|---|---|
| 2,943,476 | 7/1960 | Bernstein | 73—32 |
| 3,218,851 | 11/1965 | Sipin | 73—32 |

FOREIGN PATENTS

| | | |
|---|---|---|
| 1,287,559 | 2/1962 | France. |
| 146,081 | 7/1962 | U.S.S.R. |

RICHARD C. QUEISSER, Primary Examiner

JOHN K. LUNSFORD, Assistant Examiner